US012709995B1

(12) United States Patent
Savard et al.

(10) Patent No.: US 12,709,995 B1
(45) Date of Patent: Aug. 18, 2026

(54) GAS TURBINE ENGINE WITH A ROTOR STAGE SHROUD

(71) Applicant: Pratt & Whitney Canada Corp., Longueuil (CA)

(72) Inventors: Philippe Savard, Terrebonne (CA); Guy Lefebvre, St-Bruno (CA); Remy Synnott, St-Jean-sur-Richelieu (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/203,957

(22) Filed: May 9, 2025

(51) Int. Cl.
*F01D 25/24* (2006.01)
*F01D 11/08* (2006.01)

(52) U.S. Cl.
CPC ............ *F01D 25/246* (2013.01); *F01D 11/08* (2013.01); *F01D 25/24* (2013.01); *F01D 25/243* (2013.01); *F05D 2240/11* (2013.01)

(58) Field of Classification Search
CPC ........ F01D 25/246; F01D 11/08; F01D 25/24; F01D 25/243; F05D 2240/11
See application file for complete search history.

(56) References Cited

U.S. PATENT DOCUMENTS

| | | | | |
|---|---|---|---|---|
| 8,790,067 | B2 * | 7/2014 | McCaffrey | F01D 11/18 415/173.3 |
| 10,100,660 | B2 | 10/2018 | Sippel | |
| 10,808,575 | B2 | 10/2020 | Taxacher | |
| 11,015,485 | B2 | 5/2021 | Moga | |
| 2013/0136582 | A1 * | 5/2013 | Mizokami | F01D 11/08 415/173.1 |
| 2020/0116037 | A1 * | 4/2020 | Zurmehly | F01D 25/246 |
| 2021/0054757 | A1 * | 2/2021 | Tableau | F23R 3/60 |
| 2021/0079804 | A1 * | 3/2021 | Clark | F01D 11/08 |

* cited by examiner

*Primary Examiner* — Phutthiwat Wongwian
*Assistant Examiner* — Rene D Ford
(74) *Attorney, Agent, or Firm* — Getz Balich LLC

(57) ABSTRACT

A gas turbine engine is provided that includes a compressor section, a combustor section, and a turbine section. The turbine section includes a rotor stage and an annular shroud assembly. The annular shroud assembly is disposed radially outside of a bladed rotor, and extends circumferentially around the bladed rotor, and is coupled with a turbine support case. The annular shroud assembly includes a shroud, a shield member, a shroud retaining ring, and a cover. The shroud includes a plurality of shroud segments. Each shroud segment includes a ring portion, a forward leg, and an aft leg. The shield member has a central channel. The shroud retaining ring is disposed in the central channel. The cover is coupled with the turbine support case. The shield member is disposed between the shroud retaining ring and the shroud. The shroud is mounted to the cover and the turbine support case.

19 Claims, 13 Drawing Sheets

GAS TURBINE ENGINE WITH A ROTOR STAGE SHROUD

BACKGROUND OF THE INVENTION

1. Technical Field

The present disclosure relates to a gas turbine engines in general, and to gas turbine engine rotor shrouds in particular.

2. Background Information

A shroud may be disposed radially outside of the rotor blades of a rotor stage within a gas turbine engine to minimize core gas leakage at the tips of the rotor blades during operation and thereby improve the efficiency of the rotor stage. Core gas bypassing the rotor blades in a turbine section does not perform any work on the rotor blades. A shroud that minimizes core gas blade tip leakage would be of significant value.

SUMMARY

According to an aspect of the present disclosure, a gas turbine engine having an axial centerline is provided. The gas turbine engine includes a compressor section, a combustor section, and a turbine section. The turbine section includes a rotor stage and an annular shroud assembly, and the rotor stage includes a bladed rotor. The annular shroud assembly is disposed radially outside of the bladed rotor, and extends circumferentially around the bladed rotor, and is coupled with a turbine support case. The annular shroud assembly includes a shroud, a shield member, a shroud retaining ring, and a cover. The shroud includes a plurality of shroud segments that collectively form the shroud. Each shroud segment includes a ring portion, a forward leg, and an aft leg. The shield member has a central channel. The shroud retaining ring is disposed in the central channel. The cover is coupled with the turbine support case. The shield member is disposed between the shroud retaining ring and the shroud. The shroud is mounted to the cover and the turbine support case.

In any of the aspects or embodiments described above and herein, the shroud may be configured to permit radial movement of the shroud relative to the cover and the turbine support case.

In any of the aspects or embodiments described above and herein, the shroud may be configured to accommodate disparate thermal expansion of the shroud relative to the cover and the turbine support case.

In any of the aspects or embodiments described above and herein, the turbine support case may include an axially extending first flange segment and a radially extending second flange segment, and the aft leg of each shroud segment may be mounted to the second flange segment.

In any of the aspects or embodiments described above and herein, the aft leg of each shroud segment may be mounted to the second flange segment by a first locating pin extending between the aft leg and the second flange segment.

In any of the aspects or embodiments described above and herein, the first locating pin may be received within a first pin aperture disposed within the aft leg.

In any of the aspects or embodiments described above and herein, the first pin aperture and the first locating pin may be configured to allow travel of the first locating pin within the first pin aperture.

In any of the aspects or embodiments described above and herein, the forward leg of each shroud segment may be mounted to the cover. The cover may include a central member and an aft flange, and the aft flange may extend outwardly from the central member. The forward leg of each shroud segment may be mounted to the central member of the cover by a second locating pin extending between the forward leg and the central member.

In any of the aspects or embodiments described above and herein, the second locating pin may be received within a second pin aperture disposed within the forward leg.

In any of the aspects or embodiments described above and herein, the second pin aperture and the second locating pin may be configured to allow travel of the second locating pin within the second pin aperture.

In any of the aspects or embodiments described above and herein, the shield member may include a forward flange and an aft flange, and the central channel may include a first side wall, a second side wall, and a base wall that extends between the first and second side walls. The forward flange may extend axially outward from the first side wall, and the aft flange may extend axially outward from the second side wall. The forward flange may be in contact with the forward leg of each shroud segment and the aft flange is in contact with the aft leg of each shroud segment.

In any of the aspects or embodiments described above and herein, the shroud retaining ring may be configured to apply a radially inward force to the shield member, and the shield member may be configured to transfer the radially inward force to the forward and aft legs of the shroud segments.

In any of the aspects or embodiments described above and herein, the cover may include a central member and an aft flange. The aft flange may extend outwardly from the central member to a distal end. The turbine support case may include an axially extending first flange segment and a radially extending second flange segment. A stop rib may extend outwardly from the first flange segment. Axial movement of the shroud retaining ring may be constrained by the aft flange of the cover and the stop rib of the first flange segment.

In any of the aspects or embodiments described above and herein, the shield member and the cover with the turbine support case may define a first annular region. The turbine support case may include a plurality of apertures that form fluid communication between an outer radial region disposed radially outside of the turbine support case and the first annular region. The shield member and the shroud define a second annular region separated from the first annular region.

In any of the aspects or embodiments described above and herein, the shroud segments may comprise a ceramic matrix composite material.

According to an aspect of the present disclosure, a rotor stage shroud assembly for a gas turbine engine is provided. The gas turbine engine has a turbine support case and turbine section that includes a rotor stage having a bladed rotor. The turbine support case is disposed radially outside of the rotor stage. The shroud assembly includes a shroud, a shield member, a shroud retaining ring, and a cover. The shroud includes a plurality of shroud segments that collectively form the shroud. Each shroud segment includes a ring portion, a forward leg, and an aft leg. The shield member has a forward flange, an aft flange, and a central channel. The forward flange extends axially outward from the central channel. The aft flange extends axially outward from the central channel. The forward flange is in contact with the forward leg of each shroud segment and the aft flange is in contact with the aft leg of each shroud segment. The shroud retaining ring is disposed in the central channel. The cover is configured to be coupled with the turbine support case. The shield member is disposed between the shroud retaining ring and the shroud, and the shroud is configured for mounting to the cover and configured for mounting to the turbine support case.

In any of the aspects or embodiments described above and herein, the shield member may be formed from sheet metal.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
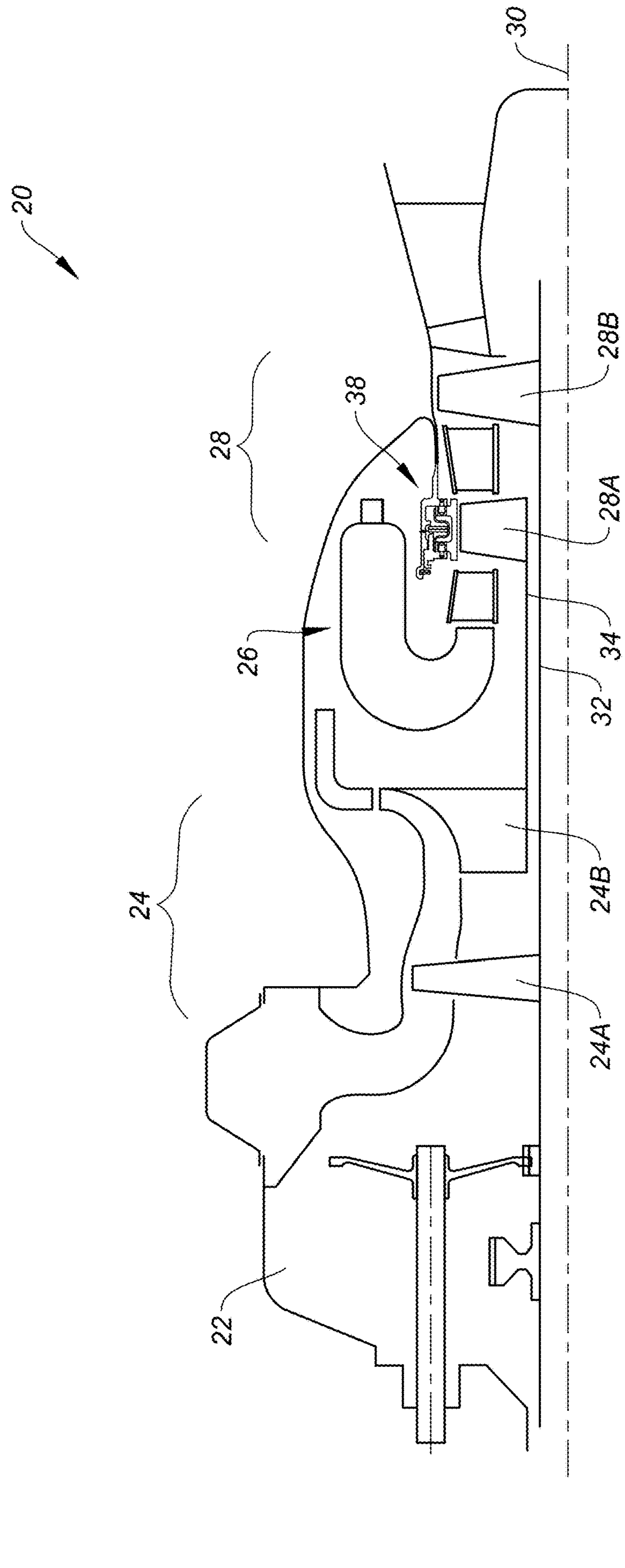
FIG. 1 is a diagrammatic illustration of a gas turbine engine.
Figure 2:
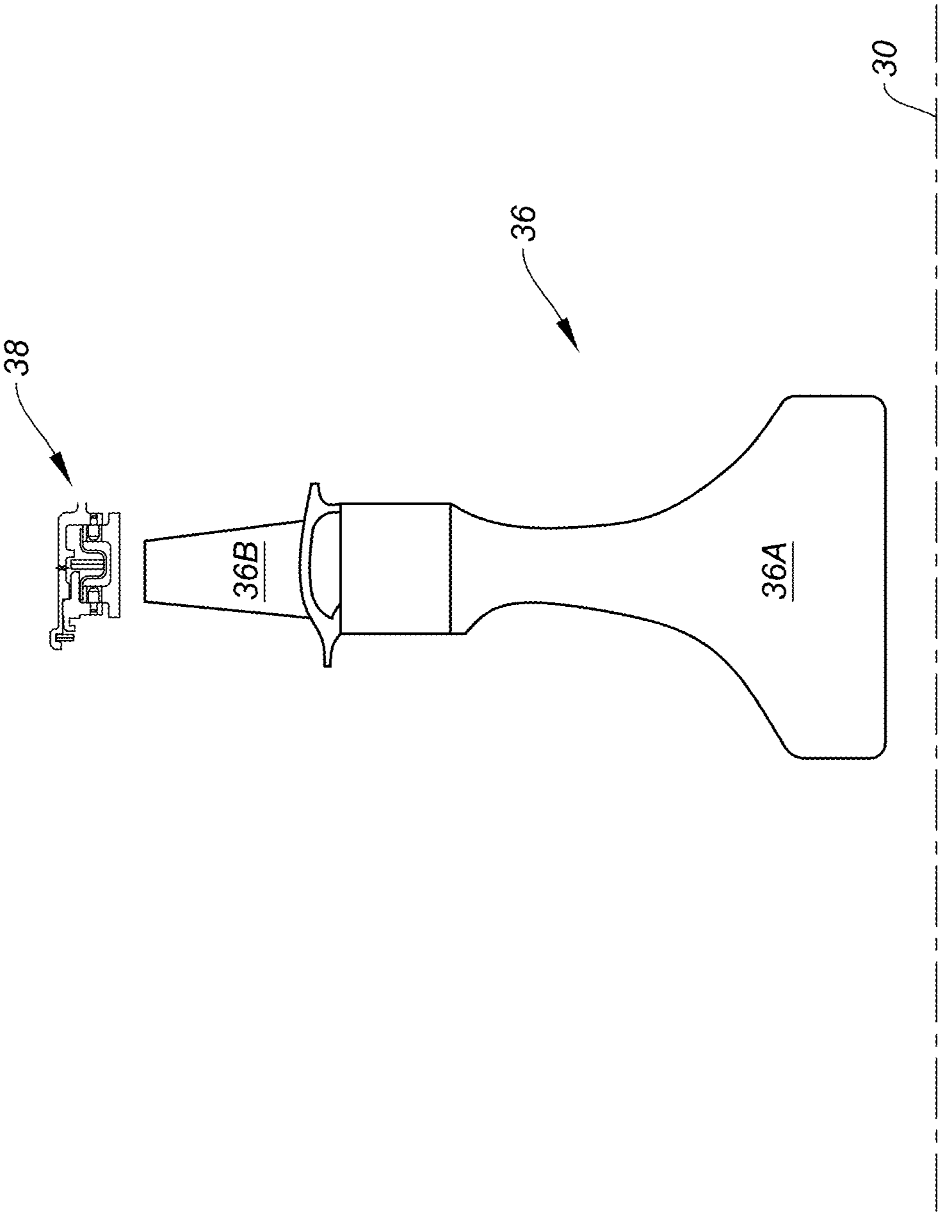
FIG. 2 is a diagrammatic view of a rotor stage with a shroud assembly.

FIG. 1 diagrammatically illustrates an example of a gas turbine engine 20 that includes a gearbox 22, a compressor section 24, a combustor section 26, and a turbine section 28 disposed relative to a axial rotational axis 30. The compressor section 24 includes a low pressure compressor 24A (L P C) and a high pressure compressor 24B (HPC). The turbine section 28 includes a high pressure turbine 28A (HPT) and a low pressure turbine 28B (LPT). A low speed shaft 32 connects the LPC 24A and the LPT 28B. A high speed shaft 34 connects the HPC 24B and the HPT 28A. The low speed shaft 32 and the high speed shaft 34 are mounted for rotation about the axial rotational axis 30. The low speed shaft 32 may drive the gearbox 22. The LPC 24A, HPC 24B, LPT 28B, and the HPT 28A may each include one or more rotor stages and one or more stator vane stages. FIG. 2 diagrammatically illustrates a rotor stage 36 having a disk 36A rotatable around the axial rotational axis 30. A plurality of rotor blades 36B extend radially outward from the disk 36A. The rotor blades 36B are circumferentially distributed around the disk 36A. FIGS. 1 and 2 diagrammatically illustrate a shroud assembly 38 disposed radially outside a rotor stage of the HPT 28A.

Air entering the engine 20 passes through the LPC 24A and the HPC 24B before entering the combustor section 26. A ir passed into the combustor section 26 is mixed with fuel and is combusted. Non-combusted air and gaseous byproducts of the combustion exit the combustor section 26 and pass through the turbine section 28 before exiting the engine 20. To facilitate the description herein, air or gaseous combustion products, or any combination thereof will be referred to as "core gas" hereinafter, unless noted otherwise. The present disclosure is not limited to use with a gas turbine engine configuration like that shown in FIG. 1; e.g., the present disclosure may be used with other gas turbine engine architectures such as turbojets, turboshafts, and the like.

A gas turbine engine 20 according to the present invention may be used to produce power for an aircraft or may be used in a land-based application. The aircraft may be an airplane, a helicopter, a drone (e.g., an unmanned aerial vehicle (UAV)) or any other manned or unmanned aerial vehicle or system.

The terms "forward" and "aft" are used herein to indicate the relative position of a component or surface. When referring to an axial flow gas turbine engine 20 like that shown in FIG. 1, a "forward" or "upstream" component encounters core gas flow prior to an "aft" or "downstream" second component; e.g., the compressor section 24 is forward/upstream of the combustor section 26, and the turbine section 28 is aft/downstream of the combustor section 26. The terms "inner radial" and "outer radial" refer to relative radial positions from the engine rotational axis 30; e.g., an inner radial component is disposed radially closer to the axis 30 than an outer radial component.

Figure 3:
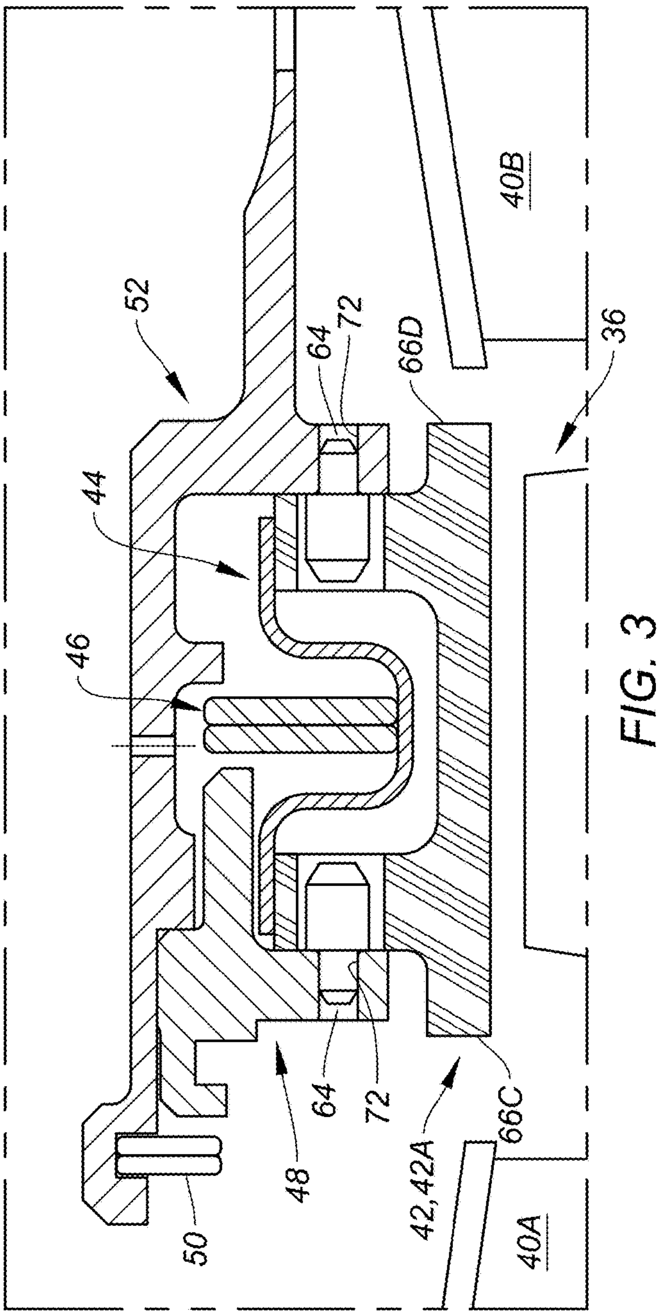
FIG. 3 is a diagrammatic view of a present disclosure shroud assembly embodiment disposed radially outside of a rotor stage.

FIG. 3 diagrammatically illustrates an annular shroud assembly 38 disposed radially outside of a turbine rotor stage (e.g., an enlarged view of the shroud shown in FIG. 1) disposed between a forward vane stage 40A and an aft vane stage 40B. The shroud assembly 38 includes a shroud 42, a shield member 44, a shroud retaining ring 46, and a cover 48. In some embodiments (e.g., like that shown in FIG. 3), the shroud assembly 38 may include a cover retaining ring 50.

Figure 4:
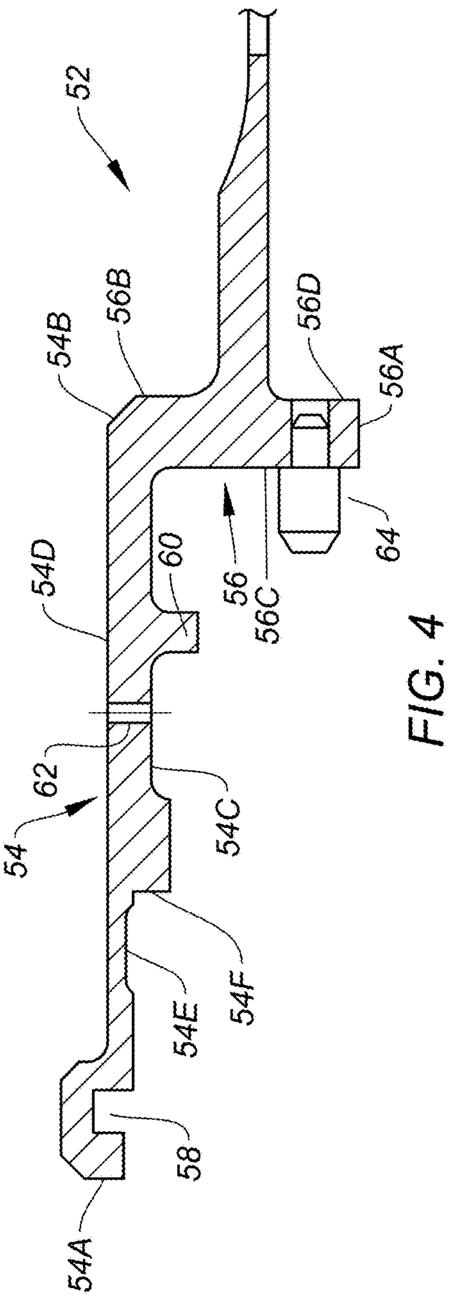
FIG. 4 is a diagrammatic view of a turbine support case.

Referring to FIG. 4, the annular shroud assembly 38 is engaged with an annular turbine support case 52 that includes an axially extending first flange segment 54 and a radially extending second flange segment 56. The first flange segment 54 extends axially between a forward end 54A and an aft end 54B. The second flange segment 56 extends radially between an inner radial end 56A and an outer radial end 56B. The aft end 54B of the first flange segment 54 is connected to the outer radial end 56B of the second flange segment 56. The turbine support case 52 may be a unitary structure that includes the first flange segment 54 and the second flange segment 56. The description herein of the first flange segment 54 extending "axially" between the forward end 54A and the aft end 54B is not intended to limit the first flange segment 54 configuration other than the forward end 54A being disposed axially forward of the aft end 54B. Similarly, the description herein of the second flange segment 56 extending "radially" between the inner radial end 56A and the outer radial end 56B is not intended to limit the second flange segment 56 configuration other than the inner radial end 56A being disposed radially inward of the outer radial end 56B. The first flange segment 54 has a radial thickness that extends between an inner radial side 54C and an outer radial side 54D. In some embodiments (e.g., like that shown in FIG. 4), the inner radial side 54C of the first flange segment 54 may include a contact surface 54E that is configured to form a slight interference fit with a contact surface 86 of the cover 48 (described herein-see FIGS. 11 and 15) when assembled. For example, the contact surface 54E of the first flange segment 54 may be an indented surface that is configured to receive a mating raised surface of the cover 48. The indented surface and the raised surface may function to both positionally locate the cover 48 relative to turbine support case 52 by way of the mating configuration and the slight interference fit. In some embodiments (e.g., like that shown in FIGS. 3 and 4, the first flange segment 54 may include a shoulder surface 54F adjacent the contact surface 54E. As will be detailed herein, the shoulder surface 54F may be configured to constrain axial movement of the cover 48. The second flange segment 56 has an axial thickness that extends between a forward axial surface 56C and an aft axial surface 56D. An annular slot 58 is disposed proximate the forward end 54A of the first flange segment 54, open on the inner radial side 54C. In some embodiments, a stop rib 60 may extend radially inward from the inner radial side 54C of the first flange segment 54. As will be detailed herein, the stop rib 60 is disposed to limit the travel of a shroud retaining ring 46. In some embodiments, a plurality of cooling apertures 62 may extend between the outer radial side 54D and the inner radial side 54C of the first flange segment 54 to permit a flow of cooling air therethrough. A structural member of an engine housing is engaged with the second flange segment 56 to secure the turbine support case 52.

Figure 12:
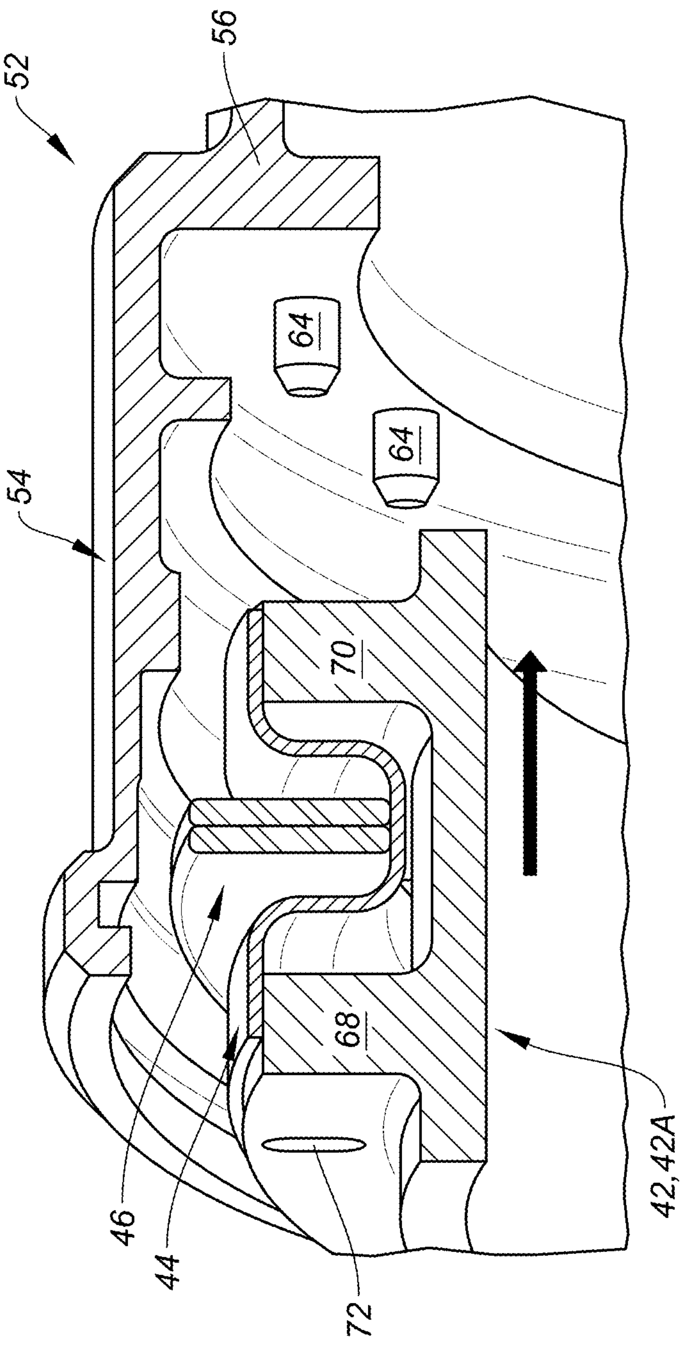
FIG. 12 is a diagrammatic view of a present disclosure shroud assembly during assembly.

FIGS. 3 and 12 illustrate locating pins 64 mounted to the second flange segment 56 of the turbine support case 52 for engagement with the shroud 42 as will be detailed herein.

Figure 5:
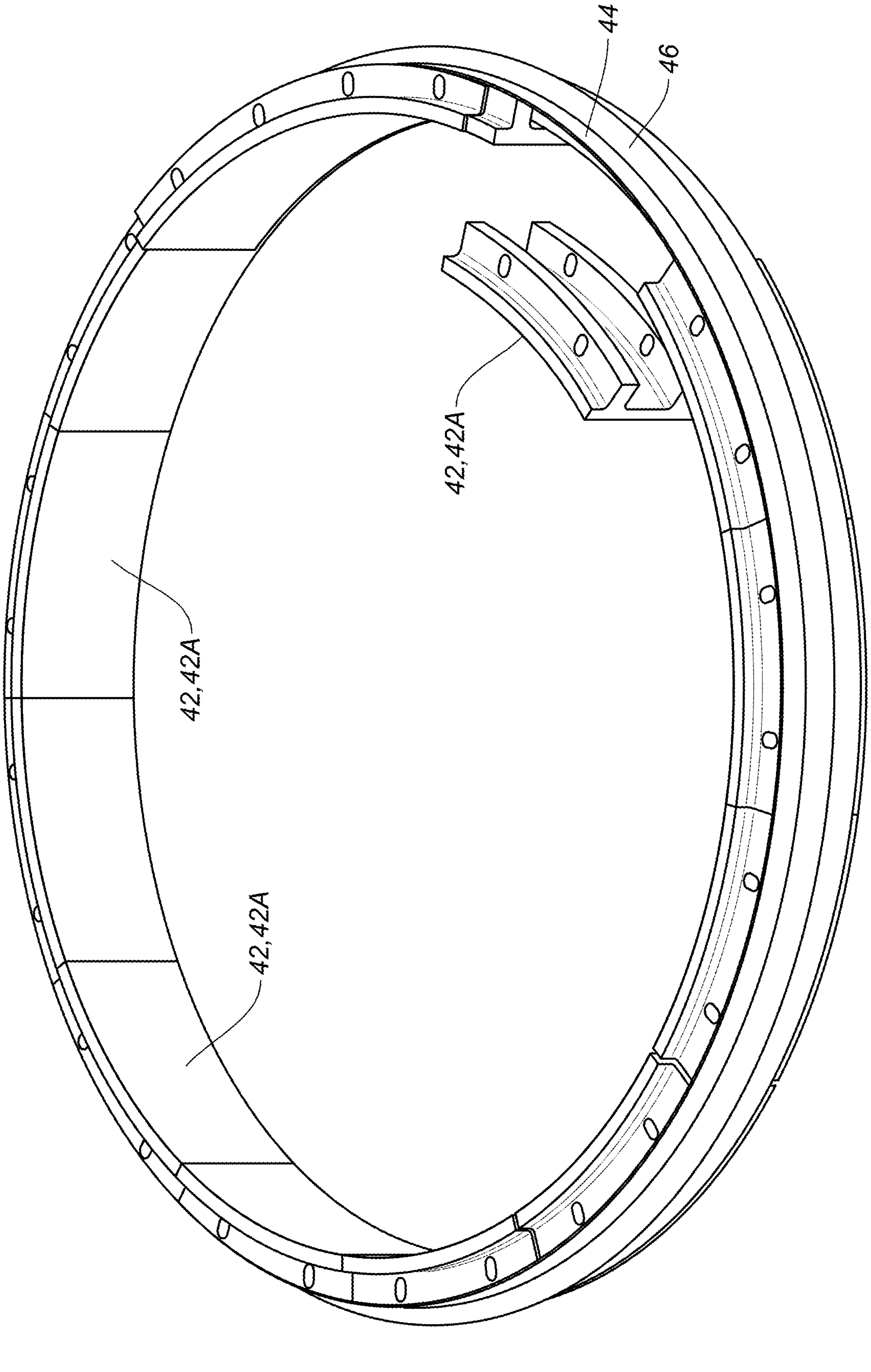
FIG. 5 illustrates elements of a present disclosure shroud assembly embodiment.
Figure 6:
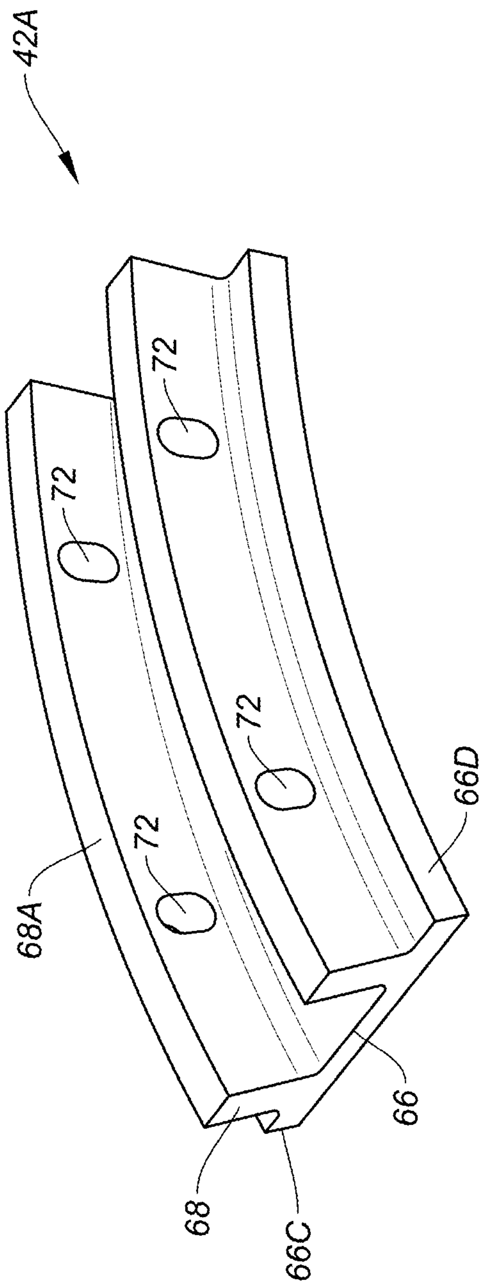
FIG. 6 is a diagrammatic perspective view of a present disclosure shroud segment embodiment.
Figure 6A:
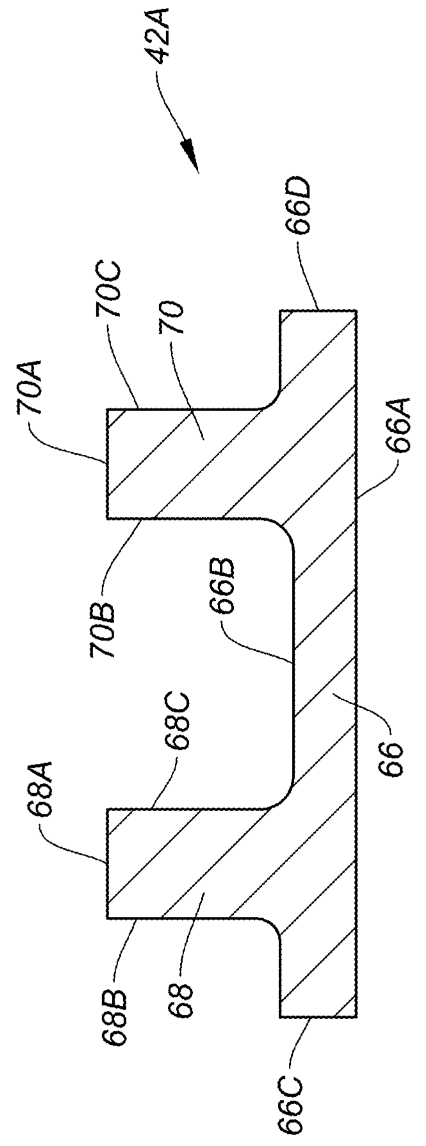
FIG. 6A is a diagrammatic end view of the present disclosure shroud segment embodiment shown in FIG. 6.

Referring to FIGS. 5, 6, and 6A, the shroud 42 is an annular structure collectively formed from a plurality of shroud segments 42A. FIG. 5 illustrates elements of the shroud assembly 38, including the shroud retaining ring 46, the shield member 44, and the shroud 42. The shroud 42 is shown collectively formed from a plurality of shroud segments 42A with a single shroud segment 42A removed from the annular shroud 42. The shroud segments 42A may comprise a ceramic matrix composite material. Non-limiting examples of CM C matrix materials include alumina, silicon carbide, aluminum nitride, silicon nitride, and the like. Non-limiting examples of C M C fiber materials include carbon, alumina, silicon carbide, mullite, and the like. The present disclosure is not limited to any particular CM C configuration.

Referring to FIGS. 6 and 6A, each shroud segment 42A includes a ring portion 66, a forward leg 68, and an aft leg 70. The ring portion 66 includes a radial thickness that extends between an inner radial surface 66A and an outer radial surface 66B. The ring portion 66 extends axially between a forward end 66C and an aft end 66D; see also FIG. 3. The forward leg 68 and the aft leg 70 both extend radially outward from the outer radial surface 66B of the ring portion 66. The forward leg 68 extends a distance (i.e., "height") from the outer radial surface 66B of the ring portion 66 to a distal end surface 68A. The forward leg 68 has a thickness that extends between a forward surface 68B and an aft surface 68C. The forward leg 68 is disposed adjacent the forward end 66C of the ring portion 66. The aft leg 70 extends a distance (i.e., "height") from the outer radial surface 66B of the ring portion 66 to a distal end surface 70A. The aft leg 70 has a thickness that extends between a forward surface 70B and an aft surface 70C. The aft leg 70 is disposed adjacent the aft end 66D of the ring portion 66 and spaced apart from the forward leg 68. In the embodiment shown in FIG. 4, the heights of the forward leg 68 and the aft leg 70 are substantially equal and the thicknesses of the forward leg 68 and the aft leg 70 are substantially equal. The present disclosure does not require the forward and aft legs 68, 70 to have the same height and/or thickness.

Referring to FIGS. 3 and 6, the forward leg 68 and the aft leg 70 of each shroud segment 42A contains at least one pin aperture 72 configured to receive a locating pin 64. In the embodiment shown in FIG. 6, the forward leg 68 and the aft leg 70 of each shroud segment 42A contains a pair of pin apertures 72. In some embodiments, the pin apertures 72 may be configured to allow the locating pin 64 to travel within the pin aperture 72. For example, the shroud segment 42A shown in FIG. 6 has pin apertures 72 with a slot configuration to allow for locating pin 64 travel as will be detailed herein.

The present disclosure is described herein with the forward leg 68 and the aft leg 70 of each shroud segment 42A containing at least one pin aperture 72 configured to receive a locating pin 64; e.g., a locating pin 64 extending out from the second flange segment 56 of the turbine support case 52 or from the cover 48. The present disclosure is not limited to this configuration. For example, in some embodiments, locating pins 64 may be included with the shroud segments 42A and corresponding pin apertures 72 may be included in the second flange segment 56 of the turbine support case 52 or the cover 48.

Figure 7:
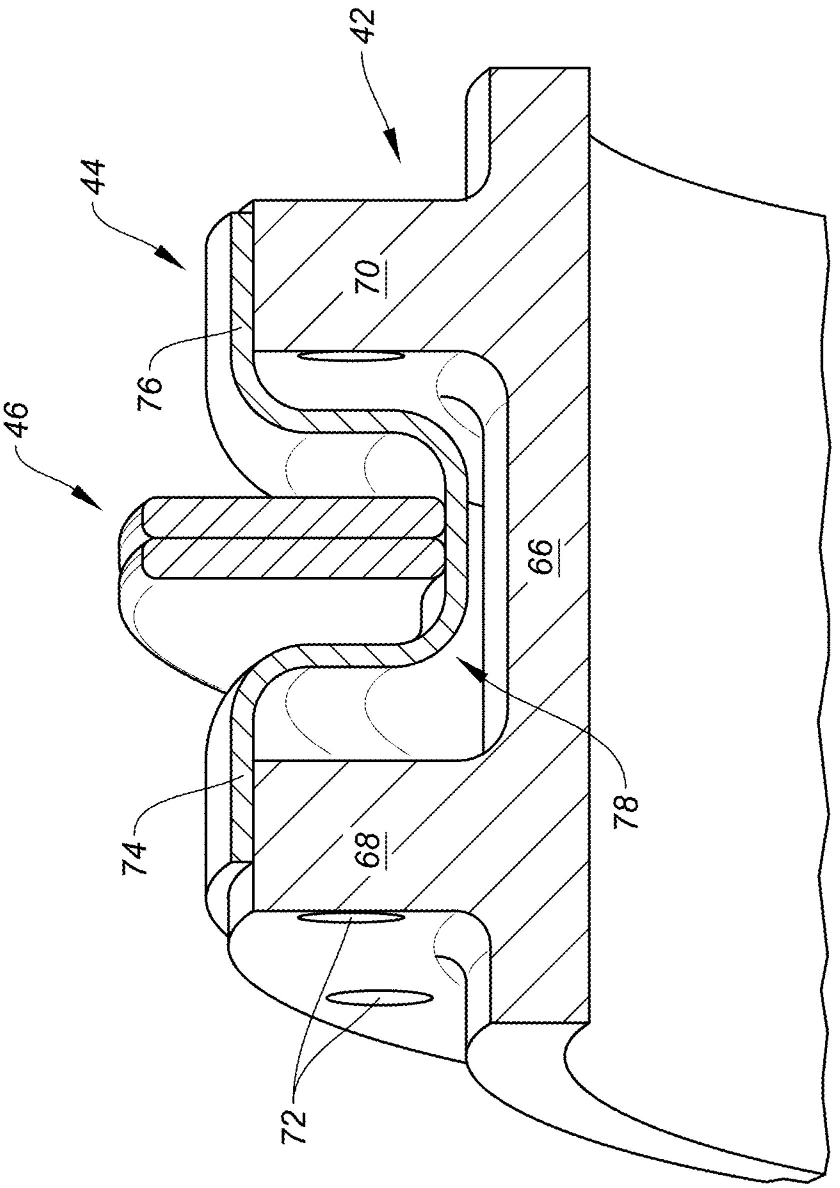
FIG. 7 is a diagrammatic perspective view of elements within a present disclosure shroud segment embodiment.
Figure 9:
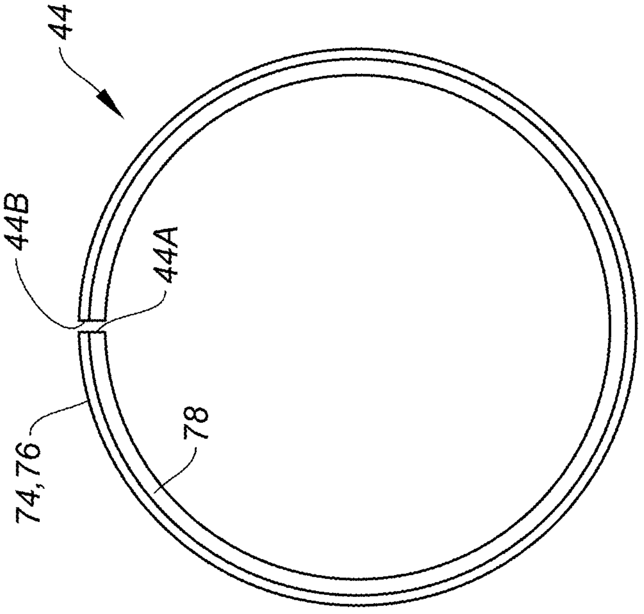
FIG. 9 is a diagrammatic view of a present disclosure shield member embodiment.
Figure 8:
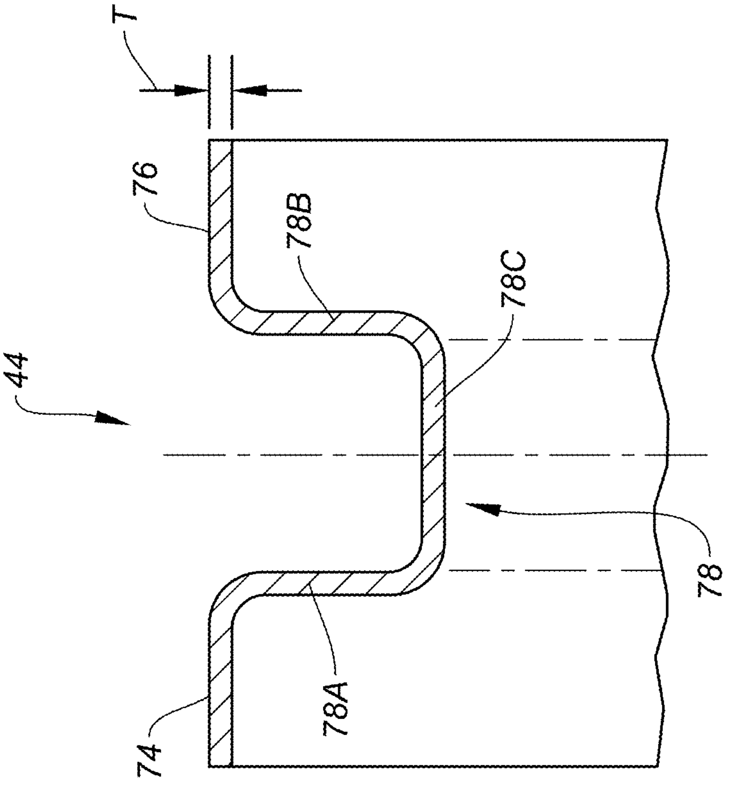
FIG. 8 is a diagrammatic view of a present disclosure shield member embodiment.

Referring to FIGS. 7-9, the shield member 44 is an annular structure that includes a forward flange 74, an aft flange 76, and a central channel 78. The central channel 78 includes a first side wall 78A, a second side wall 78B, and a base wall 78C that extends between the first and second side walls 78A, 78B. The forward flange 74 extends axially outward from the first side wall 78A at an outer radial end of the shield member 44. The aft flange 76 extends axially outward from the second side wall 78B at the outer radial end. The forward and aft flanges 74, 76 extend axially away from the central channel 78 in opposite directions. The central channel 78 has an open end disposed between the forward and aft flanges 74, 76 and an interior region defined by the first side wall 78A, the second side wall 78B, and the base wall 78C. In some embodiments, the shield member 44 is cut to form two butt ends 44A, 44B (e.g., see FIG. 9) to facilitate assembly. In the embodiment shown in FIGS. 7-9, the shield member 44 is shown as a unitary structure that has a uniform thickness ("T") throughout the forward and aft flanges 74, 76 and the central channel 78 but that is not required. The shield member 44 may be an assembled structure and may vary in thickness. The shield member 44 may be formed from a metallic material (e.g., sheet metal) having a thickness that is thin enough for the forward and aft flanges 74, 76 to elastically deflect and transfer a radially inward force from the shroud retaining ring 46 as will be described herein.

Figure 10:
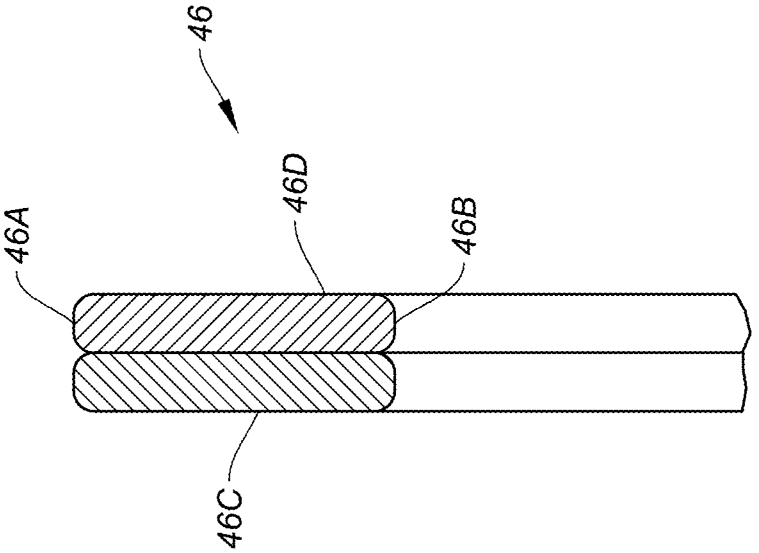
FIG. 10 is a diagrammatic view of a present disclosure shroud retaining ring embodiment.

Referring to FIGS. 3 and 10, the shroud retaining ring 46 is an annular structure that includes an outer radial surface 46A and an inner radial surface 46B. The outer radial surface 46A is disposed at outer diameter of the shroud retaining ring 46 and the inner radial surface 46B is disposed at the inner diameter of the shroud retaining ring 46. A first side wall 46C extends between the inner and outer radial surfaces 46A, 46B on a first side of the shroud retaining ring 46 and a second side wall 46D extends between the inner and outer radial surfaces 46A, 46B on a second side of the shroud retaining ring 46. The first side wall 46C and the second side wall 46D are opposite one another. In some embodiments, the shroud retaining ring 46 may be formed as a continuous hoop extending 360 degrees. In some embodiments, the shroud retaining ring 46 may be formed as a helical body that includes several circular revolutions that collectively form a continuous hoop. In the embodiment diagrammatically shown in FIGS. 3 and 10, the shroud retaining ring 46 includes a pair of ring elements attached to one another to form the annular structure. The present disclosure is not limited to any particular shroud 42 configuration other than one that is operable to function as detailed herein. The shroud retaining ring 46 may be formed of a metallic material.

Figure 11:
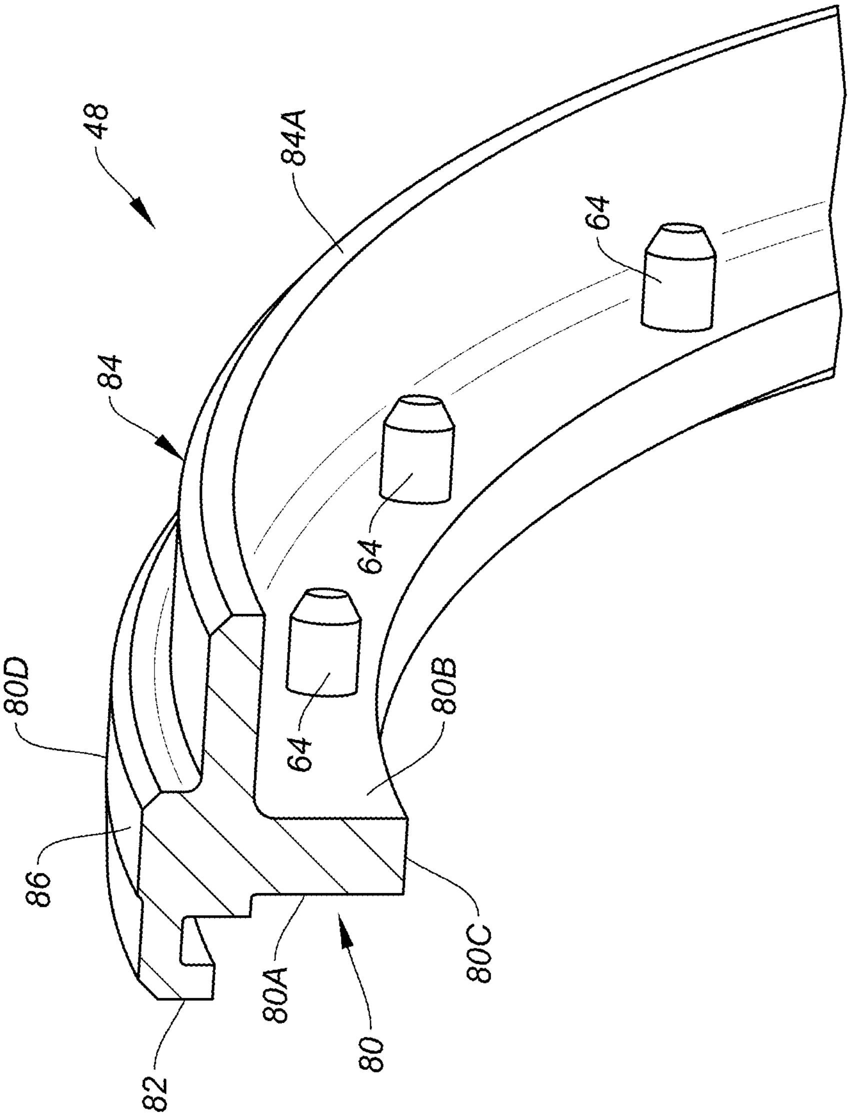
FIG. 11 is a diagrammatic perspective view of a present disclosure cover embodiment.

Referring to FIGS. 3 and 11, the cover 48 is an annular structure that includes a central member 80, a forward cover flange 82, and an aft cover flange 84. The central member 80 includes a first side surface 80A, a second side surface 80B, an inner radial end 80C, and an outer radial end 80D. The forward cover flange 82 extends axially outward from the first side surface 80A adjacent the outer radial end 80D of the central member 80. The aft cover flange 84 extends axially outward from the second side surface 80B to a distal end 84A. The aft cover flange 84 is spaced apart from the outer radial end 80D of the central member 80 by a distance. As indicated herein, the outer radial end 80D of the central member 80 includes contact surface 86 that is configured to form a slight interference fit with a contact surface 54E of the first flange segment 54 of the turbine support case 52 when assembled. In the embodiment shown in FIGS. 3 and 11, the contact surface 86 of the central member 80 is a raised surface. As can be seen in FIGS. 3 and 11, the cover 48 may include locating pins 64 extending outwardly from the second side surface 80B of the central member 80 for engagement with the pin apertures 72 disposed in the forward leg 68 of the shroud segments 42A.

During assembly, the shield member 44 may be disposed so that the shroud retaining ring 46 is received within the central channel 78 of the shield member 44. Next, the shroud segments 42A may be assembled radially inside of the coupled shroud retaining ring 46 and shield member 44; e.g., see FIG. 5. During the assembly of the shroud segments 42A to form the shroud 42, the shroud retaining ring 46 acting on the shield member 44 imparts an inward tension to the shroud 42; e.g., a radially inward force applied from the forward and aft flanges 74, 76 of the shield member 44 to the forward and aft legs 68, 70 of the shroud segments 42A. Once all the shroud segments 42A are in place and the shroud 42 is fully formed as a hoop, the radial inward force produces reaction forces between the circumferential end surfaces of adjacent shroud segments 42A. The reaction forces between the collective shroud segments 42A provide the shroud 42 with integrity.

Referring to FIG. 12, the assembled shroud 42, shield member 44, and shroud retaining ring 46 next may be mounted on the second flange segment 56 of the turbine support case 52. During the mounting, the locating pins 64 extending out from the second flange segment 56 are received within the pin apertures 72 disposed in the aft leg 70 of the shroud segments 42A; e.g., see FIGS. 3 and 6.

Figure 13:
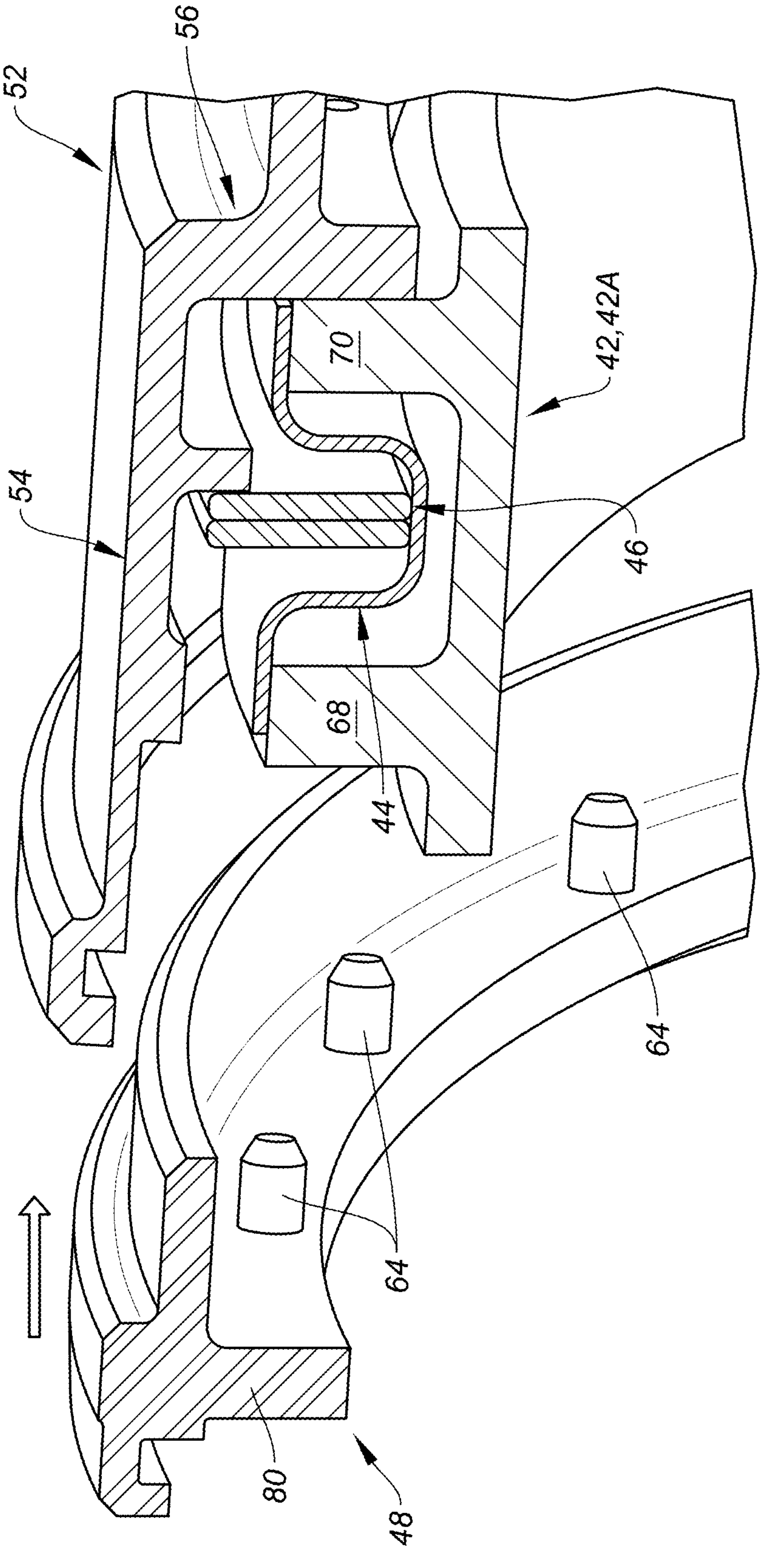
FIG. 13 is a diagrammatic view of a present disclosure shroud assembly during assembly.
Figure 14:
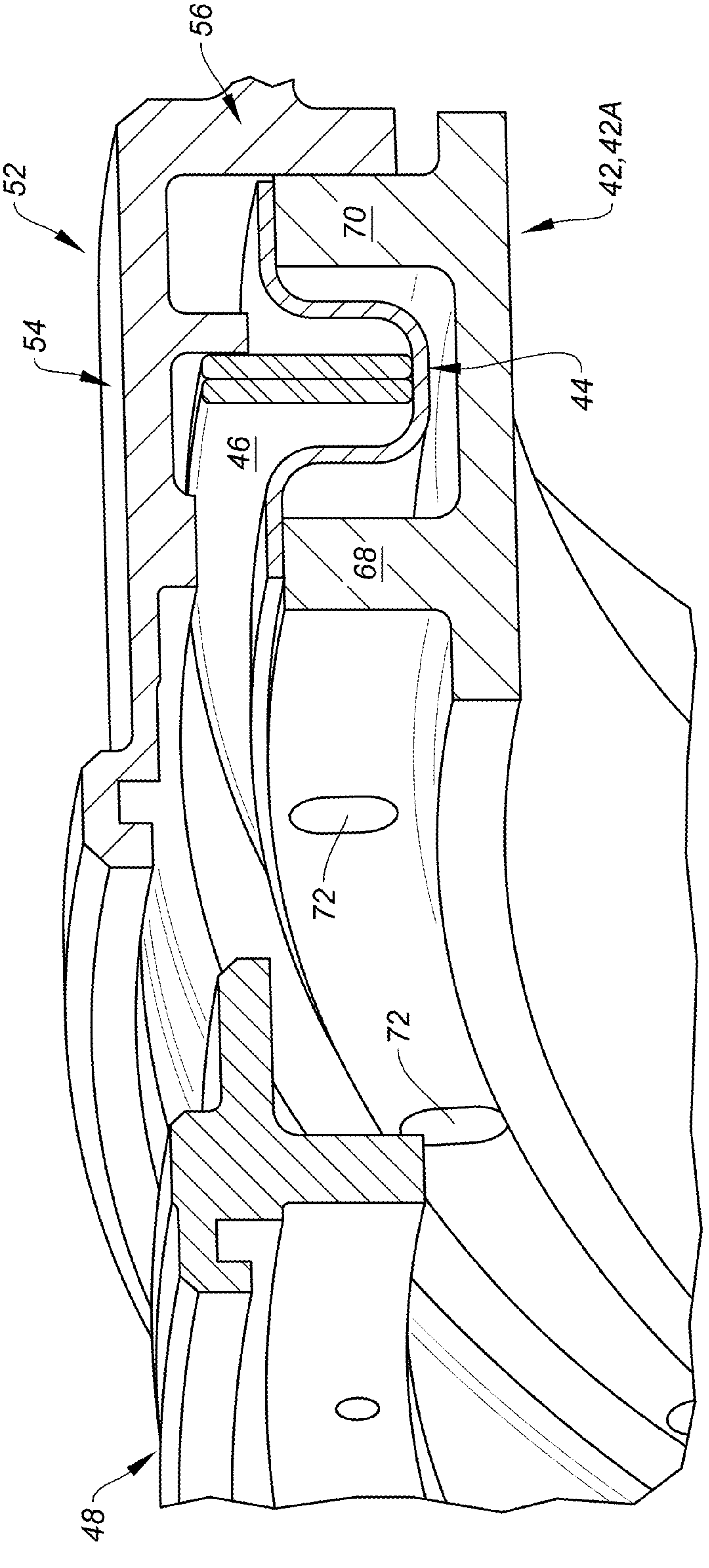
FIG. 14 is a diagrammatic view of a present disclosure shroud assembly during assembly.

Referring to FIGS. 13 and 14, the cover 48 may next be connected with the collective shroud 42, shield member 44, and shroud retaining ring 46 now mounted on the second flange segment 56 of the turbine support case 52. During the mounting of the cover 48, the locating pins 64 extending out from the central member 80 of the cover 48 (see FIG. 13) are received within the pin apertures 72 (see FIG. 14) disposed in the forward leg 68 of the shroud segments 42A.

Figure 15:
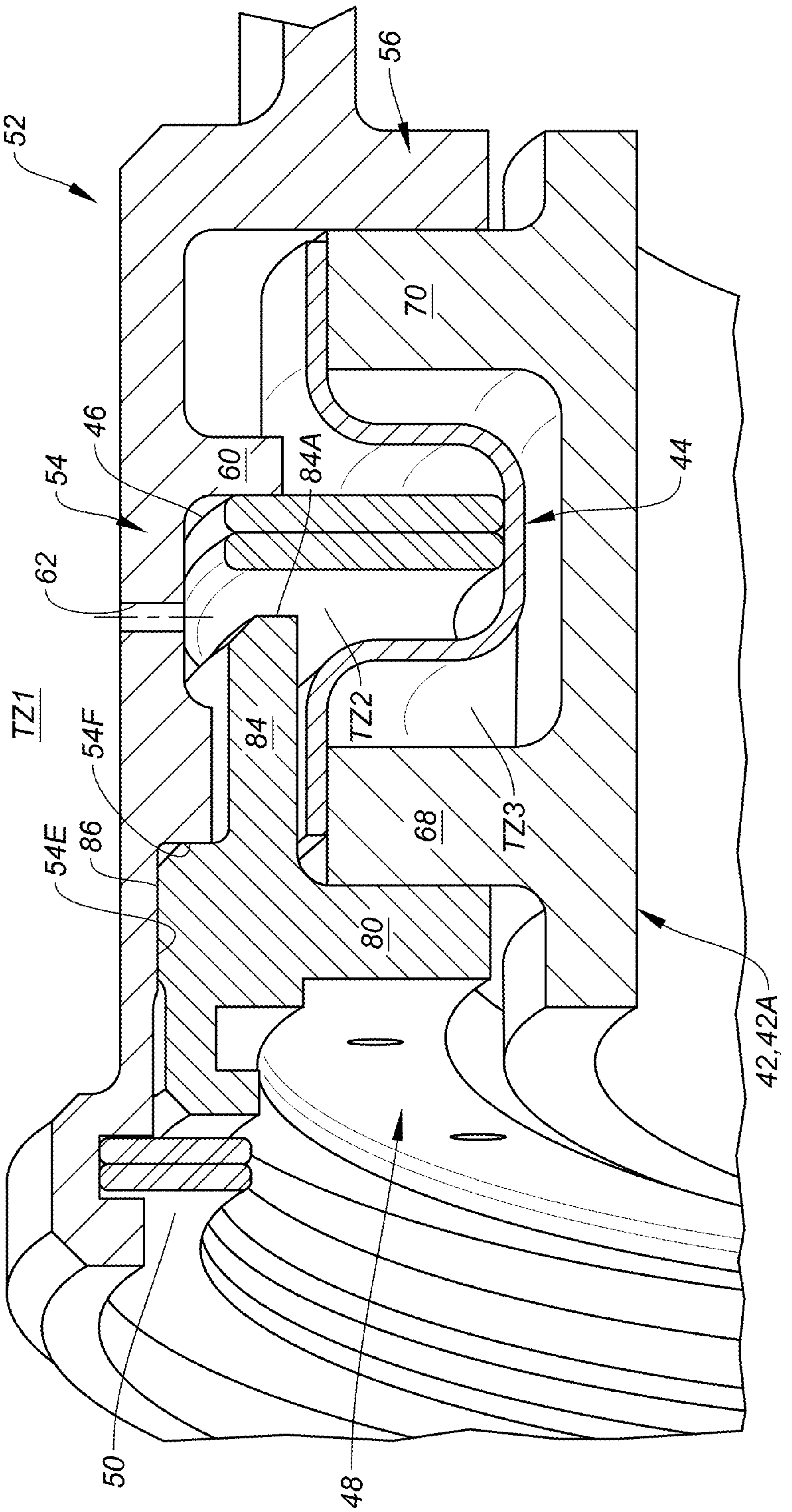
FIG. 15 is a diagrammatic view of a present disclosure shroud assembly in assembled form.

FIG. 15 illustrates the shroud assembly 38 in assembled form mounted on the turbine support case 52. In assembled form, axial movement of the shroud 42 is constrained by second flange segment 56 of the turbine support case 52 on one side and by the central member 80 of the cover 48 on the opposite side. Also in assembled form, axial movement of the shroud retaining ring 46 is constrained by the stop rib 60 on one side and by the distal end 84A of the aft cover flange 84 on the opposite side. Axial movement of the cover 48 is constrained by the cover retaining ring 50 on one side (where the cover retaining ring 50 is engaged with the turbine support case 52) and by the shoulder surface 54F of the turbine support case 52 on the opposite side.

Referring to FIGS. 3 and 15, the mounting between the shroud segments 42A and the cover 48 and between the shroud segments 42A and the turbine support case 52 (i.e., the locating pins 64 and the pin apertures 72) is such that the shroud segments 42A are not fixed and the shroud 42 is capable of radially expanding and contracting; e.g., as a function of thermal expansion and contraction. This aspect is understood to be a distinct benefit when the shroud 42 comprises a ceramic matrix composite material that has thermal expansion characteristics that differ from the thermal expansion characteristics of the shroud assembly components that support the shroud 42. The shroud retaining ring 46 and the shield member 44 provide hoop integrity to the shroud 42 collectively formed from the shroud segments 42A. In addition, the shield member 44 may function as a thermal barrier. As described herein, in some embodiments the turbine support case 52 may include cooling air apertures 62 that provide fluid communication with between a first region (referred to as thermal zone 1 or "TZ1") disposed radially outside of the turbine support case 52, and a second region (referred to as thermal zone 2 or "TZ2") disposed radially between the turbine support case 52 and the shield member 44. A third region (referred to as thermal zone 3 or "TZ3") is disposed radially between the shield member 44 and the shroud 42. During operation of the gas turbine engine 20, core gases disposed in the core gas path radially inside of the shroud 42 are at very high temperatures. Cooling air at an elevated pressure is disposed in TZ1. The elevated pressure provides the motive force to drive a flow of the cooling air through the cooling apertures 62 and into TZ2. The temperature of the cooling air in TZ2 is lower than the temperature of the air in TZ3 which is influenced by the high temperature core gas in the core gas path. Hence, the shield member 44 facilitates maintaining the shroud retaining ring 46 in a lower temperature environment. The shield member 44 also separates the shroud retaining ring 46 from the shroud 42 and thereby prevents wear (e.g., fretting) that may occur if the shroud retaining ring 46 is in contact with the shroud 42.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine having an axial centerline, the gas turbine engine comprising:
- a compressor section;
- a combustor section; and
- a turbine section, wherein the turbine section includes a rotor stage and an annular shroud assembly, wherein the rotor stage includes a bladed rotor;
- wherein the annular shroud assembly is disposed radially outside of the bladed rotor, and extends circumferentially around the bladed rotor, and is coupled with a turbine support case, the turbine support case includes an axially extending first flange segment and a radially extending second flange segment;
- wherein the annular shroud assembly comprises:
  - a shroud comprising a plurality of shroud segments that collectively form the shroud, wherein each shroud segment includes a ring portion, a forward leg, and an aft leg, the aft leg mounted to the second flange segment;
  - a shield member having a central channel;
  - a shroud retaining ring disposed in the central channel; and
  - a cover coupled with the turbine support case;
- wherein the shield member is disposed between the shroud retaining ring and the shroud;
- wherein a portion of the shield member is disposed between the forward leg and the aft leg; and
- wherein the shroud is mounted to the cover and the turbine support case.

2. The gas turbine engine of claim 1, wherein the shroud is configured to permit radial movement of the shroud relative to the cover and the turbine support case.

3. The gas turbine engine of claim 1, wherein the shroud is configured to accommodate disparate thermal expansion of the shroud relative to the cover and the turbine support case.

4. The gas turbine engine of claim 1, wherein the aft leg of each shroud segment is mounted to the second flange segment by a first locating pin extending between the aft leg and the second flange segment.

5. The gas turbine engine of claim 4, wherein the first locating pin is received within a first pin aperture disposed within the aft leg.

6. The gas turbine engine of claim 5, wherein the first pin aperture and the first locating pin are configured to allow travel of the first locating pin within the first pin aperture.

7. The gas turbine engine of claim 1, wherein the forward leg of each shroud segment is mounted to the cover; and
- wherein the cover includes a central member and an aft flange, and the aft flange extends outwardly from the central member; and wherein the forward leg of each shroud segment is mounted to the central member of the cover by a second locating pin extending between the forward leg and the central member.

8. The gas turbine engine of claim 7, wherein the second locating pin is received within a second pin aperture disposed within the forward leg.

9. The gas turbine engine of claim 8, wherein the second pin aperture and the second locating pin are configured to allow travel of the second locating pin within the second pin aperture.

10. The gas turbine engine of claim 1, wherein the shield member includes a forward flange and an aft flange, and the central channel includes a first side wall, a second side wall, and a base wall that extends between the first and second side walls;

wherein the forward flange extends axially outward from the first side wall, and the aft flange extends axially outward from the second side wall; and wherein the forward flange is in contact with the forward leg of each shroud segment and the aft flange is in contact with the aft leg of each shroud segment.

11. The gas turbine engine of claim 10, wherein the shroud retaining ring is configured to apply a radially inward force to the shield member, and the shield member is configured to transfer the radially inward force to the forward and aft legs of the shroud segments.

12. The gas turbine engine of claim 1, wherein the cover includes a central member and an aft flange, wherein the aft flange extends outwardly from the central member to a distal end;

wherein the turbine support case includes an axially extending first flange segment and a radially extending second flange segment, and a stop rib extends outwardly from the first flange segment; and wherein axial movement of the shroud retaining ring is constrained by the aft flange of the cover and the stop rib of the first flange segment.

13. The gas turbine engine of claim 1, wherein the shield member and the cover with the turbine support case define a first annular region, and the turbine support case includes a plurality of apertures that form fluid communication between an outer radial region disposed radially outside of the turbine support case and the first annular region; and wherein the shield member and the shroud define a second annular region separated from the first annular region.

14. The gas turbine engine of claim 1, wherein the shroud segments comprise a ceramic matrix composite material.

15. A rotor stage shroud assembly for a gas turbine engine, the gas turbine engine having a turbine support case and turbine section that includes a rotor stage having a bladed rotor, wherein the turbine support case is disposed radially outside of the rotor stage, the shroud assembly comprising:

a shroud comprising a plurality of shroud segments that collectively form the shroud, wherein each shroud segment includes a ring portion, a forward leg, and an aft leg;

a shield member having a forward flange, an aft flange, and a central channel, wherein the forward flange extends axially outward from the central channel, and the aft flange extends axially outward from the central channel, and the forward flange is in contact with the forward leg of each shroud segment and the aft flange is in contact with the aft leg of each shroud segment;

a shroud retaining ring disposed in the central channel; and a cover configured to be coupled with the turbine support case;

wherein the shield member is disposed between the shroud retaining ring and the shroud, the central channel of the shield member is disposed between the forward leg and the aft leg, and the shroud is configured for mounting to the cover and configured for mounting to the turbine support case.

16. The rotor stage shroud assembly of claim 15, wherein the shroud retaining ring is configured to apply a radially inward force to the shield member, and the shield member is configured to transfer the radially inward force to the forward and aft legs of the shroud segments.

17. The rotor stage shroud assembly of claim 16, wherein the shield member is formed from sheet metal.

18. The rotor stage shroud assembly of claim 15, wherein the shield member and the cover with the turbine support case define a first annular region; and wherein the shield member and the shroud define a second annular region separated from the first annular region.

19. The rotor stage shroud assembly of claim 18, wherein the shroud segments comprise a ceramic matrix composite material.

* * * * *